Sept. 8, 1959          A. WORMSER          2,903,278
DISTRIBUTOR SEAL
Filed Feb. 11, 1957          2 Sheets—Sheet 1
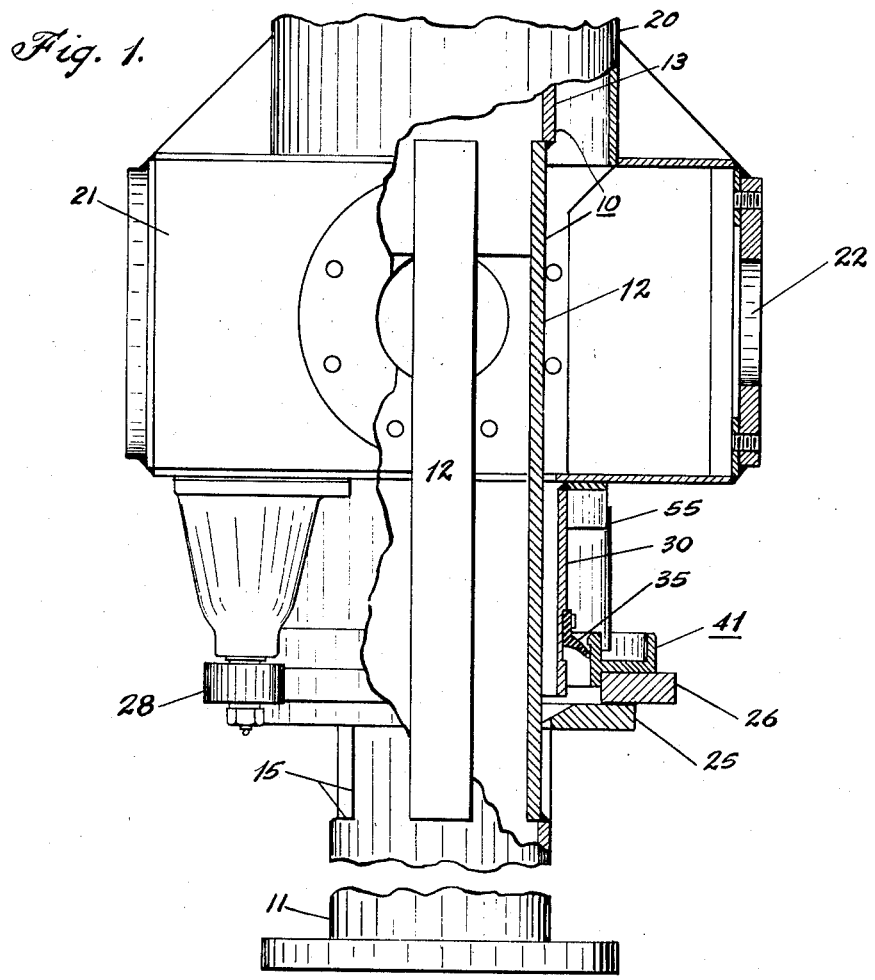
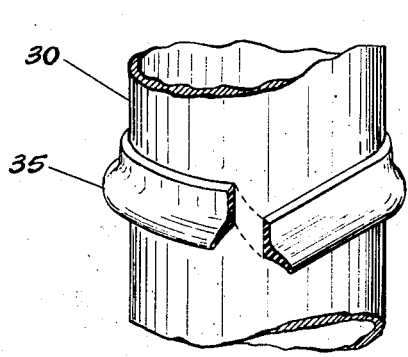
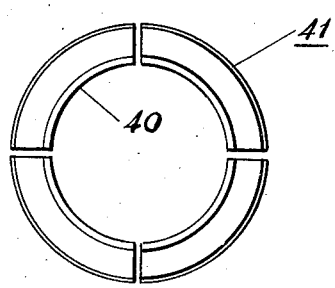

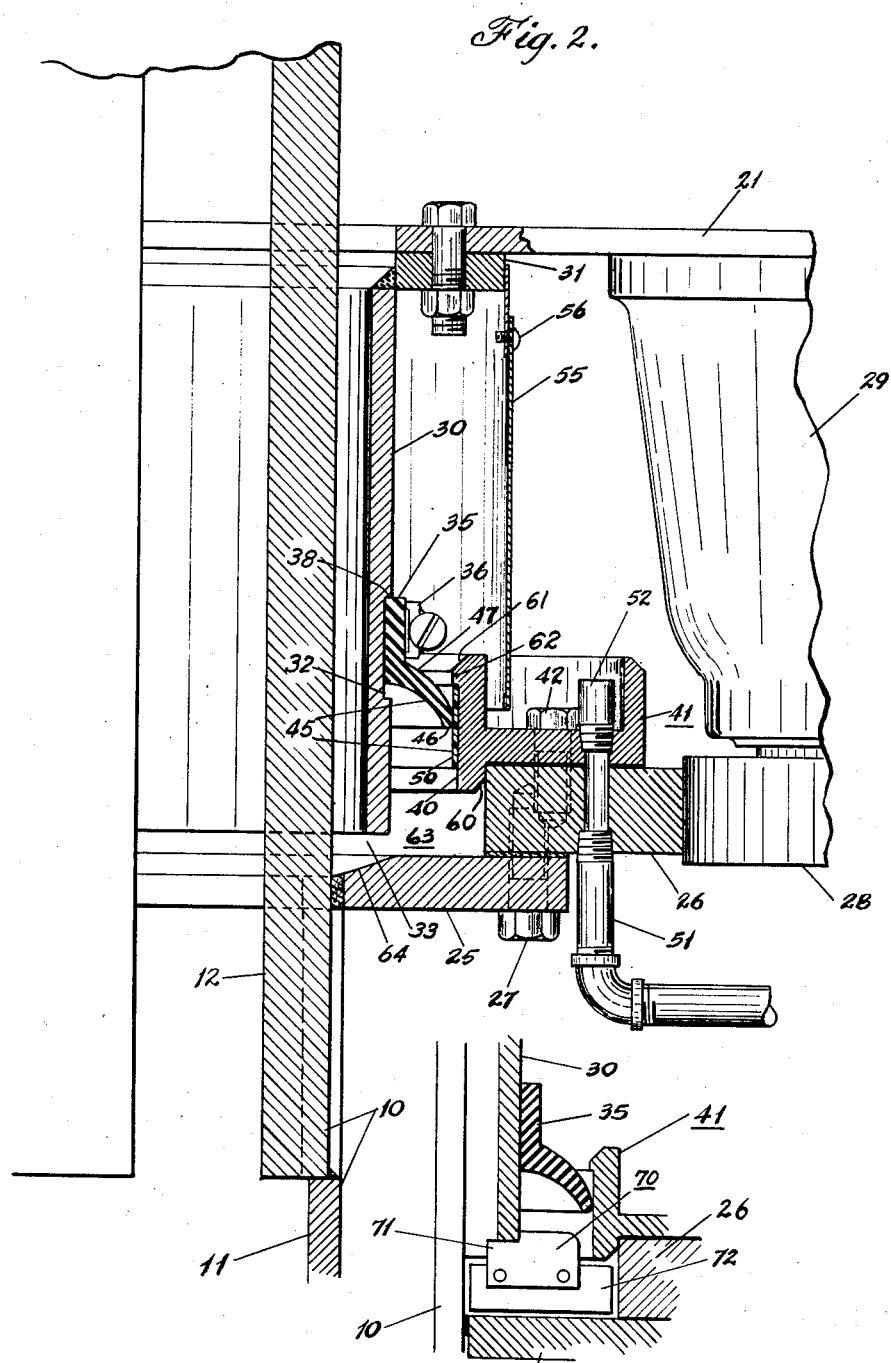

United States Patent Office

2,903,278
Patented Sept. 8, 1959

2,903,278
DISTRIBUTOR SEAL

Arthur Wormser, Tucson, Ariz., assignor to Infilco Incorporated, Tucson, Ariz., a corporation of Delaware Application February 11, 1957, Serial No. 639,375

10 Claims. (Cl. 285—11)

This invention relates to a rotary liquid distributor for filters, and more particularly to an improved seal between the stationary and the rotating parts of a rotary distributor.

An object of this invention is to provide an improved sealing device for a rotary distributor, which is relatively inexpensive, does not require the use of mercury, and is removable so that it can be replaced without dismantling other parts of the distributor.

Another object of the invention is to provide a seal for a rotary liquid distributor with improved drain means and with means minimizing entry and build up of grit in the seal chamber.

A further object of this invention is to provide grit removal means for the seal chamber of a rotary liquid distributor.

A further object of this invention is to provide a dust seal for the seal of a rotary liquid distributor.

A further object of the invention is to provide a resilient sealing device for a rotary liquid distributor wherein the pressure of the liquid to be distributed increases the sealing effect of the sealing device.

Still another object of the invention is to provide a sealing device which permits removing and replacing the rotating portion of the distributor without disturbing the seal.

Other objects of the invention will become apparent from the description and claims which follow.

In the treatment of sewage and other waste liquors by the trickling filter process, the liquid to be treated is sprayed over a filter bed to provide uniform distribution of liquid thereover. Liquid distributors for such filters may be of the fixed type wherein a plurality of stationary nozzles are placed above the filter bed; or they may be of the rotary type wherein the liquid to be filtered is introduced through a fixed central column having ports and distributed over the filter bed by rotating arms communicating with the ports and extending radially across the filter bed. The arms may be driven by the reaction from the liquid discharge or by any suitable power means. My invention relates to the rotary type of distributor and provides an improved sealing device between the stationary and the rotating parts of the distributor.

Rotary distributors ordinarily comprise a hollow, fixed base portion having a hollow stationary center column rigidly affixed thereto. This assembly is mounted in the filter bed in such a manner that the liquid to be filtered enters through the base portion and flows up through the center column. A rotatable outer column surrounds the upper portion of the center column and carries a plurality of distributor arms which extend radially across the bed. The stationary center column is provided with ports, through which the liquid flows into a space between the columns, and out through the distributor arms. Some means must obviously be provided to seal the connection between the stationary center column and the rotatable outer column in order to prevent flooding of the filter bed adjacent the center column and the base portion.

Usually mercury seals are used. One disadvantage of mercury seals lies in the fact that a pressure increase over a fixed amount in the center column will force the mercury out of the seal. Another disadvantage resides in the fact that grit contained in the liquid to be filtered has a tendency to settle into the seal, pack therein and to hinder rotation of the cylinder.

Seals which do not employ mercury are known and are usually referred to as mechanical seals. It is to an improved seal of this type that my invention relates.

My invention will be fully understood by reference to the following detailed description and the drawings which form a part hereof and wherein like reference characters in the several figures designate similar elements.

Figure 1 is an elevation, partly in section, of the improved distributor column and sealing means;

Figure 2 is an enlarged detail view of the sealing means shown in Figure 1;

Figure 3 is a perspective view showing the one-piece, split construction of the resilient portion of the sealing device;

Figure 4 is a plan view showing the segmental construction of a portion of the sealing device; and Figure 5 is an elevation, partly in section, of a grit scraper that can be used with a sealing device of the type shown in Figure 2.

Referring to Figure 1, the distributor comprises a stationary center column or member 10 having a base portion 11, a plurality of columns or posts 12, and an upper cylindrical portion 13. The base 11 serves as an inlet conduit for the liquid to be treated and is rigidly affixed to a suitable foundation such as a concrete column rising through the filter bed, not shown. The upper periphery of the base 11 has cut-out portions 15 into which the columns or posts 12 are secured, as by welding. The upper ends of the columns 12 support the cylindrical portion 13 in similar cut-outs.

A rotatable outer member or column 20 carrying a liquid distributing manifold 21 at its lower end, is supported and mounted, by means not shown, for rotation about the center column 10. The manifold 21 has a plurality of outlet ports 22 adapted to receive liquid distributing arms, not shown.

Referring to Figure 2, a ring 25 is affixed around the upper end of the base 11 and carries a stationary guide ring 26 affixed thereto by any suitable means, such as the bolts 27. Rollers 28, supported from the manifold 21 by means of brackets 29, run on the stationary guide ring 26 to guide the outer column 20 and the manifold 21 during their rotation.

An annular baffle or skirt 30 is rigidly affixed to the manifold 21, as by an annular plate 31 to which it may be welded. The skirt 30 has a recessed portion 32 for a purpose to be discussed below. The skirt extends downwardly toward the ring 25, leaving an opening 33 therebetween.

A resilient sealing strip 35 encircles the skirt 30 and is maintained in position thereon by a clamping band 36. The sealing strip 35 is prevented from sliding upwardly on the skirt 30 by a shoulder 38 of the recessed portion 32. The sealing strip 35, which is made of rubber-like material, such as neoprene, or of a plastic material, such as a plasticized polyvinyl chloride, may be either of molded or extruded construction. The strip 35 is split, as shown in Figure 3, so that it may be wrapped around the skirt 30 without dismantling the distributor. The ends of the strip 35 are cemented or welded together after the strip has been wrapped around the skirt 30.

The strip 35 cooperates with the inner wall 40 of an annular channel 41 which is affixed to the guide ringe 26, as by bolts 42, to form a seal 45 between the rotatable and stationary parts of the distributor. The lip 46 of strip 35 is made to a slightly larger diameter than the wall 40 so that a seal between the lip 46 and the wall 40 is formed. Upward pressure on lip 46 will press it more firmly against wall 40 and increase the sealing effect therebetween. The strip 35 has a comparatively heavy profile at its root 47 to prevent upward pressure from forcing the lip 46 up above wall 40.

It is essential, particularly with reaction driven distributors where the liquid head may be quite low at times, to keep friction between lip 46 and wall 40 as low as possible. To this end, I prefer to make the diameter of lip 46 only slightly larger than the inside diameter of channel 41, to make lip 46 comparatively thin, and to shape the strip 35 in such a manner that a line passing through root 47 and lip 46 is 45° from the normal plane of the strip 35, thereby maintaining the least normal pressure between lip 46 and wall 40. In addition, I provide a plastic liner 50 on the side of the wall 40 cooperating with lip 46, and preferably, cemented to it. The liner is made out of a material having a low coefficient of friction and a good wear resistance. One such material is a tetrafluoroethylene resin sold by Du Pont under the trademark "Teflon." Another product that can be used with advantage is a plastic material sold by the Dixon Corporation under the trademark "Rulon."

The rollers 28 are spaced equally from skirt 30, thereby centering the skirt with respect to guide ring 26. Since channel 41 is also centered on guide ring 26 the distance between skirt 30 and wall 40 of channel 41 will be the same at every point of the circumference and root 47 of strip 35 will undergo a minimum of deflection.

Any liquid leaking past the seal 45 will overflow the wall 40 and collect in channel 41. A drain 51 leading from channel 41 to a point over the filter bed, not shown, permits withdrawal of liquid from the channel 41. Drain 51 has a raised portion 52 so that a liquid level in channel 41 is maintained. A dust shield 55, affixed to plate 31, extends into the liquid in channel 41, thereby preventing dust from entering the space between skirt 30 and shield 55. The shield 55 may be made of sheet metal and be vertically adjusted by loosening screws 56. A felt seal may be used in place of the water seal.

The channel 41 is of the segmental construction shown in Figure 4, making it possible to remove the channel without removing rollers 28 and their brackets 29. Such removal is desirable when the liner 50 needs to be replaced. The joints between the segments of channel 41 may be sealed with a putty-like material.

Referring again to Figure 2, a taper 60 is provided to facilitate sliding the segments into position on guide ring 26 and to squeeze the putty-like material together when the channel 41 is pressed down on the guide ring by bolts 42.

My improved sealing device is so constructed and arranged that the rotatable portion of the distributor can be removed and reinstalled without removing the seal. When the rotatable portion is reinstalled, a sloping portion 61 provided on wall 40 permits the lip 46 to slide back into place on liner 50 without damage. A projection 62 protects the edge of liner 50 during this operation.

After a prolonged period of operation of the distributor, it might be found that liner 50 has become worn at the point of contact with lip 46. In that event, the sealing strip 35 may be slid downwardly in recess 32 of skirt 30 to obtain contact with a different part of the liner. It will then be desirable to insert a spacer, not shown, between the sealing strip 35 and the shoulder 38 to prevent upward movement of the strip.

As described above, a part of the center column 10 is replaced by posts 12. Between the posts, the base portion 11 of center column 10 reaches up to ring 25 which is fastened to its upper rim. This construction prevents liquid from running out below ring 25 and provides a wide, open area between the posts 12, with which the opening 33 between ring 25 and skirt 30 registers, so that grit entering the seal chamber 63 between skirt 30 and wall 40 can readily return to the center column. To further facilitate return of grit to the center column, the ring 25 has a sloping portion 64, as shown. By using the posts 12 instead of a cylindrical column, packing of grit along the inside wall of skirt 30 is prevented.

In some cases where excessive amounts of grit are carried by the liquid to be filtered, a positive means for removing the grit from the seal chamber 63 may be desirable. To this end, a scraper 70, shown in Figure 5, may be used. The scraper 70 may consist of an upper rigid portion 71 and a lower flexible portion 72. The scraper is attached to the skirt 30 by any suitable means, not shown, and rotates therewith to urge grit toward the opening 33.

It will be seen that my invention avoids the use of mercury seals and provides a simple and efficient seal which can be readily removed without dismantling other parts of the distributor.

Many modifications and variations of the invention may be made by persons skilled in the art without departing from the spirit and scope thereof, such as making the stationary center column of a one piece construction by cutting elongated slots in a cylinder connecting with the outlet ports 22 in manifold 21 and a series of separate holes right above ring 25 as an outlet for grit. It is to be understood that while best results will probably be attained with the construction and arrangement shown, these are to be taken as preferred embodiments, only, of the invention and that minor changes coming within the scope of the appended claims may be included within the sphere hereof.

I claim:

1. In a liquid distributor including a stationary member and a rotatable member, sealing means between said stationary and rotatable members, comprising an annular skirt encircling said stationary member and affixed to said rotatable member, a sealing strip affixed to said skirt and having a resilient lip flaring outwardly therefrom, and wall means affixed to said stationary member, said wall means having extension at an elevation subjacent the lower end of said skirt and including a portion concentric with said skirt and laterally spaced therefrom a distance such that it is contacted by said lip, and means for preventing upward displacement of said resilient sealing strip by liquid pressure, said means including a recessed portion on said skirt of such length that it permits vertical adjustment of said sealing strip.

2. In a liquid distributor including a stationary tabular member, and a member rotatable about a portion of said stationary member, sealing means between said stationary and rotatable members, comprising an annular skirt encircling said stationary member and affixed at its upper portion to said rotatable member, a resilient sealing strip affixed to said skirt and having a lip flaring outwardly therefrom, annular wall means affixed to said stationary member, said wall means having a portion extending at an elevation subjacent the lower end of said skirt and a portion concentric with and laterally spaced from said skirt a distance such that it is contacted by said resilient lip, said skirt, wall means and sealing strip forming a sealed space surrounding said stationary member, and means establishing communication for said liquid between the interior of said stationary member and said rotatable member comprising a port in said stationary member establishing hydraulic communication between the interior of said stationary member and said space at an elevation subjacent the lower end of said skirt.

3. The device of claim 2 including a liner affixed to the side of said concentric portion of said wall means facing said lip, said liner being made of a material having a low coefficient of friction.

4. The device of claim 2 including also means for preventing upward displacement of said resilient sealing strip by liquid pressure, said means including a recessed portion on said skirt.

5. The device of claim 2 including grit removal means comprising a scraper affixed to and rotatable with said skirt, and adapted to scrape grit from said wall means.

6. The device of claim 2 characterized in that the part of said wall means subjacent the lower end of said skirt has a portion sloping toward said port.

7. The device of claim 2 wherein said resilient sealing strip is split.

8. The device of claim 2 characterized in that said stationary tubular member comprises a hollow base member forming an inlet conduit extending through said base member, a plurality of posts affixed in spaced relationship about said base member and extending upwardly therefrom, and a cylinder affixed to the upper ends of said posts, the spaces between said posts forming elongated ports establishing said hydraulic communication between said stationary member and said sealed space.

9. The device of claim 2 characterized in that said concentric portion of said annular wall means comprises an annular channel having drain means establishing a liquid level therein.

10. The device of claim 9 including a dust seal comprising an annular shield affixed to said rotatable member and concentric with said skirt, said shield extending into said channel to an elevation below the liquid level established by said drain means.

References Cited in the file of this patent
UNITED STATES PATENTS

| | | |
|---|---|---|
| 705,066 | Friesleben | July 22, 1902 |
| 1,078,727 | Geiger | Nov. 18, 1913 |
| 2,379,547 | Sperry | July 3, 1945 |
| 2,467,312 | Jock | Apr. 12, 1949 |
| 2,688,500 | Scott | Sept. 7, 1954 |
| 2,717,792 | Pelley | Sept. 13, 1955 |
| 2,729,474 | Unger | Jan. 3, 1956 |
| 7,797,108 | Royer | June 25, 1957 |